United States Patent [19]

Shimizu

[11] 3,766,615
[45] Oct. 23, 1973

[54] METHOD OF POLARIZING PIEZOELECTRIC ELEMENTS
[75] Inventor: Masao Shimizu, Tokyo, Japan
[73] Assignee: Denki Onkyo Company, Limited, Tokyo, Japan
[22] Filed: Sept. 2, 1970
[21] Appl. No.: 68,883

[30] Foreign Application Priority Data
Sept. 9, 1969 Japan................ 44/71148

[52] U.S. Cl.................................... 29/25.35, 310/8
[51] Int. Cl............................................. H04r 31/00
[58] Field of Search.............. 29/25.35, 592, 592 E; 179/DIG. 10, 100.41 B, 111 E; 307/88 T, 88 ET; 310/9.4, 9.5, 8

[56] References Cited
UNITED STATES PATENTS
3,549,913  12/1970  Moriki et al....................... 310/9.5
3,586,889  6/1971   Kolter................................ 310/8.4
3,562,792  2/1971   Berlincourt et al................. 310/9.5
3,660,699  5/1972   Sakurai et al....................... 310/9.8

FOREIGN PATENTS OR APPLICATIONS
681,671  10/1952  Great Britain............ 179/100.41 B OTHER PUBLICATIONS
Physical Review, An Improved Method of Making Electrets & Factors Which Affect Their Behavior, Good & Stranathan 10/15/39, Charge Storage in Solid Dielectrics, Gross, 1964, p. 42.

Primary Examiner—Richard J. Herbst
Assistant Examiner—D. C. Crane
Attorney—Chittick, Pfund, Birch, Samuels and Gauthier

[57] ABSTRACT

A piezoelectric element is polarized by applying electroconductive rubber pads on the opposite surfaces of the low voltage driving portion and on the end surface of the high voltage output portion and by applying DC polarization voltages across these pads while the element is being maintained in insulating oil.

2 Claims, 2 Drawing Figures

PATENTED OCT 23 1973                                3,766,615

INVENTOR.
MASAO SHIMIZU

METHOD OF POLARIZING PIEZOELECTRIC ELEMENTS

BACKGROUND OF THE INVENTION

This invention relates to a method of polarizing piezoelectric elements.

Piezoelectric elements are made of ceramics, lead ziconate, for example, and have recently become the object of the attention of the art as means for converting low voltages into high voltages. Piezoeletric elements to be used as such voltage converting elements generally take the form of rectangular plates and the opposite surfaces of one half of each element are used as driving surfaces while the end surface of the remaining half is utilized as the output of the high voltage. The reason that the piezoelectric element operates as a step-up transformer is that the driving portion and output portion have residual polarization.

According to a prior method of polarizing a piezoelectric element, silver films are applied onto the opposite surfaces of one half of the element corresponding to the low voltage driving portion by sputtering or coating and a DC voltage is impressed across these silver films to use them as polarization electrodes. The end surface of the element acting as the high voltage output is similarly coated with a silver film and a DC voltage is impressed across the silver film at the output and the silver films at the driving portion to polarize the high voltage output portion. In this manner, the polarization of the output portion is performed by the application of a high DC voltage. However since the piezoelectric element is subjected to mechanical stress in proportion to the polarization voltage when the stress exceeds a permissible value, the element will be broken. Further, since the accuracy of the result of manufacturing the elements are not uniform, a substantial number of element is destroyed due to excessive mechanical stress. For this reason, destruction of the elements due to polarization treatment after application of the silver films results in a great loss.

SUMMARY OF THE INVENTION

Accordingly it is an object of this invention to provide a novel method of polarizing a piezoelectric element without the necessity of applying silver film electrodes for polarization.

Another object of this invention is to provide a simple method of polarizing a piezoelectric element.

According to this invention there is provided a method of polarizing a piezoelectric element comprising the steps of clamping the low voltage driving portion of the element between electroconductive, heat and oil resistant rubber pads, urging another electroconductive, heat and oil resistant rubber pad against the end surface of the high voltage output portion of the element, immersing the element with the rubber pads in insulating oil, and applying polarization DC voltages across the rubber pads on the low voltage driving portion and across these rubber pads and the other rubber pad while the element is being immersed in the insulating oil.

After removal of the rubber pads, electrodes for connecting lead wires are applied on the driving and ouput portions to complete a piezoelectric converting element. Since these electrodes are used for the connection of lead wires and are not utilized for polariztion, they may be much smaller than prior electrodes which have been used for the dual purposes of polarization and lead wire connection.

DESCRIPTION OF THE PREFERRED EMBODIMENT

Figure 1:
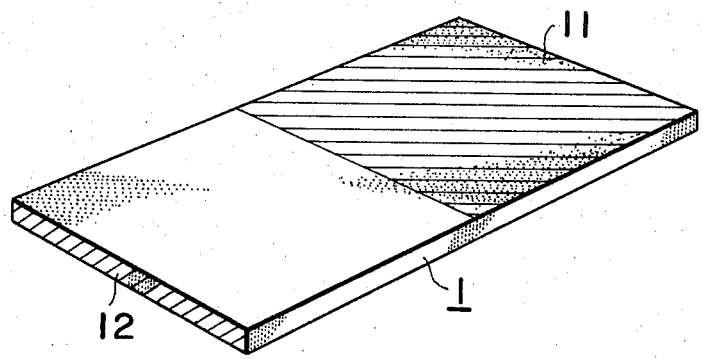
FIG. 1 is a perspective view of a piezoelectric element before polarization.

In the piezoelectric element shown in FIG. 1, the right hand half, shown as shaded, is utilized as the low voltage driving portion 11 while the shaded end surface 12 of the remaining half is utilized as the high voltage output portion.

According to this invention, the first step comprises a washing treatment to remove surface contaminants from the piezoelectric element. Since this washing treatment may be the same washing treatment for the element to which silver electrodes for polarization are to be applied according to the prior polarization method, description thereof is believed unnecessary.

Figure 2:
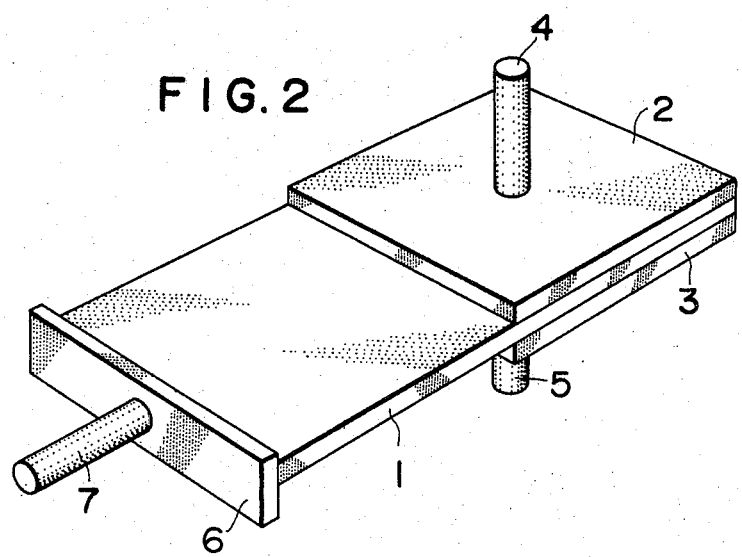
FIG. 2 is a perspective view to explain the novel method of polarization.

Then, as shown in FIG. 2, electroconductive, heat and oil resistant rubber pads 2 and 3 are applied on the entire area of the opposite surfaces of the low voltage driving portion 11 to clamp the same between rubber pads. Rubber pads 2 and 3 are firmly held against the surfaces of the low voltage driving portion by means of rods 4 and 5 of the same material as the pads. Similarly a pad 6 of the same material is firmly urged against the end surface 12 to cover the entire area thereof. Pad 6 has an integral lead rod 7. Then the piezoelectric element 1 applied with the electroconductive heat and oil resistant pads is immersed in insulating oil heated to a temperature of about 100° to 150°C.

During this immersion, high voltage output portion 12 is provided with a longitudinal residual polarization by impressing a DC voltage with pads 2 and 3 negative and pad 6 positive. At the same time the low voltage driving portion 11 is provided with a residual polarization in the direction of the thickness of the element by impressing a DC voltage across pads 2 and 3. Either one of them may be positive or negative.

In this invention, it is advantageous to fabricate the piezoelectric element from materials having improved electro-mechanical convertion ability (high piezoelectric constant) and high mechanical Q, for example lead titanate-ziroconate $Pb(TiZr)O_3$. Preferably, the rubber pads urged against the element has a conductivity of about 10 Kiloohms/mm²-cm, high oil resistance and does not undergo plastic deformation. The oil for immersing the element may be a silicone oil heated to 100° to 150°C. Immersion time of 30 to 60 minutes is sufficient and the polarization DC voltage applied across the element may be 2 to 3 KV/mm. Accordingly, the voltage required to polarize the driving portion in the direction of its thickness of a piezoelectric element of the dimensions of 1.5 × 3.5 × 56mm amounts to 7 − 10.5KV while the voltage required to polarize the output portion in the longitudinal direction to 56 to 84KV.

The piezoelectric element polarized in this manner has uniform residual polarizations not only in the driving portion but also in the region extending between the driving and output portions. Even with the polarization method of this invention, as in the conventional method, elements not sufficiently durable to the mechanical stress generated by the impression of the high DC polarization voltage will be broken. After the polarization treatment, the rubber pads are removed from the element for use with the next element. After removal of the rubber pads, the driving portion of the piezoelectric element is polarized in the direction of its thickness and the output portion in the longitudinal direction so that it is possible to use the element as a voltage converting element by applying low voltage supply means to the driving portion and high voltage driving means to the output portion.

More particularly, silver electrodes are applied to polarized driving portion and output portion by sputtering or coating techniques and then lead wires are soldered to the silver electrodes. Since the silver electrodes are not used for polarization as in the prior art, it is not necessary to make them large enough to cover the entire areas of the driving and output portions. The silver electrodes are used to connect the driving lead wire to the driving portion and to connect the output lead wire to the output portion and the area of the electrodes may be much smaller than that of the driving portion or output portion.

In this manner, in accordance with this invention polarization is provided without using silver electrodes for polarization and only small electrodes are applied to polarized regions for connecting lead wires. This not only simplifies the fabrication of the piezoelectric elements but also lessens the number of those piezoelectric elements which are broken by the mechanical stress during manufacture, thus saving the cost of manufacturing the piezoelectric elements.

It will be clear that this invention is not limited to the illustrated embodiment and that many changes and modifications will occur to one skilled in the art without departing from the true spirit and scope of the invention as defined in the appended claims.

What is claimed is

1. A method of manufacture of piezoelectirc voltage converting devices comprising the steps of removably clamping the low voltage driving portion of a piezoelectric element between electroconductive, heat and oil resistant rubber pads which extend over the entire area of said driving portion to be polarized, urging another electroconductive, heat and oil resistant rubber pad against the end surface of the high voltage output portion of said element, immersing said element with said rubber pads in heated insulating oil, applying high polarization DC voltages across said rubber pads on said low voltage driving portion and between said rubber pads on said low voltage driving portion and said rubber pad on said high voltage output portion while said element is being immersed in said insulating oil for a period of time to effect polarization and removing said pads from said element after polarization is achieved.

2. The method according to claim 1 which further comprises the steps of removing said rubber pads after polarization and applying electrodes to a portion of the surfaces previously contacted by said pads for connecting lead wires to said driving and output portions whereby to obtain a piezoelectric voltage converting device.

* * * * *

UNITED STATES PATENT OFFICE
CERTIFICATE OF CORRECTION

Patent No. 3,766,615     Dated October 23, 1973

Inventor(s)    Masao Shimizu

It is certified that error appears in the above-identified patent and that said Letters Patent are hereby corrected as shown below:

Column 1, lines 7 - 8, "ziconate" should read -- zirconate --. Column 2, line 52, after "and" insert -- heat resistance and --. Column 3, line 23, delete "of the electrodes" and substitute -- of these silver electrodes --.

Signed and sealed this 1st day of October 1974.

(SEAL)
Attest:

McCOY M. GIBSON JR.
Attesting Officer

C. MARSHALL DANN
Commissioner of Patents